No. 654,661. Patented July 31, 1900.
J. F. MITCHELL.
ORE SEPARATOR.
(Application filed Sept. 7, 1899.)
(No Model.)

Witnesses:

Inventor:
John F. Mitchell
by Addison G. DuBois,
Attorney.

UNITED STATES PATENT OFFICE.

JOHN F. MITCHELL, OF TOPEKA, KANSAS.

ORE-SEPARATOR.

SPECIFICATION forming part of Letters Patent No. 654,661, dated July 31, 1900.

Application filed September 7, 1899. Serial No. 729,758. (No model.)

*To all whom it may concern:*

Be it known that I, JOHN F. MITCHELL, a citizen of the United States, residing at Topeka, in the county of Shawnee and State of Kansas, have invented certain new and useful Improvements in Ore-Separators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to ore-separators, its object being to provide a simple and efficient apparatus by which the fine particles of metal may be separated from rock and earthy substances.

The invention consists of the novel details of construction and combination of parts hereinafter described and claimed.

Figure 1:
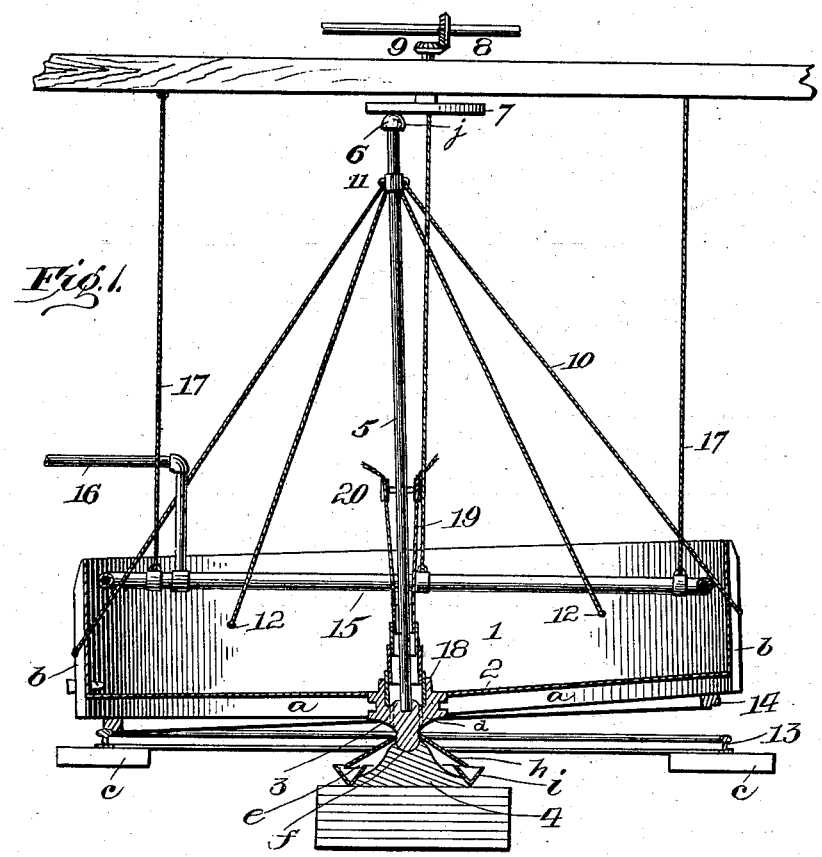
Figure 2:
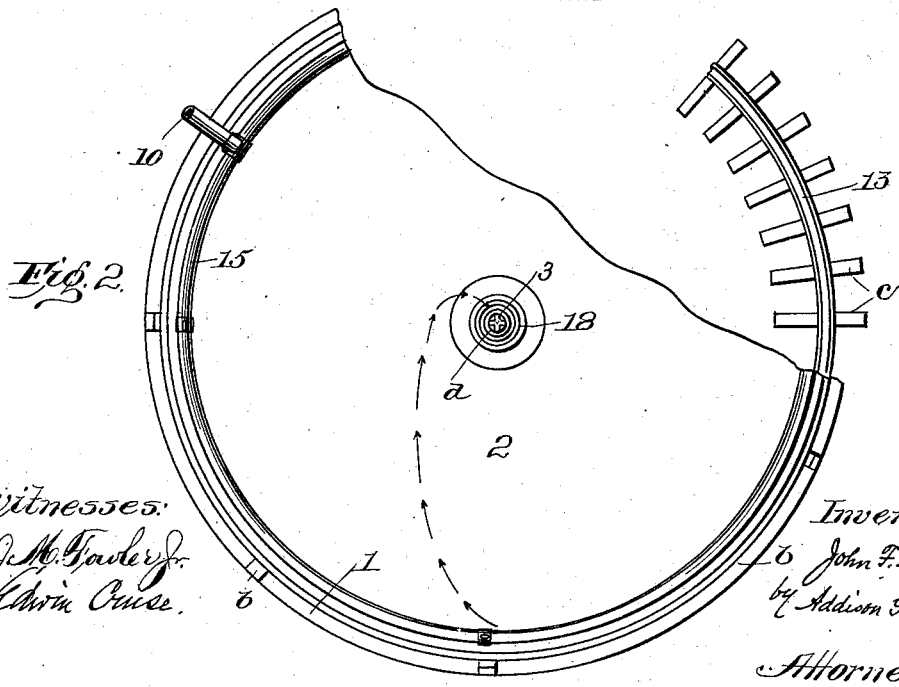

In the accompanying drawings, Figure 1 is a sectional elevation of an apparatus made in accordance with my invention; and Fig. 2 is a plan view, partly broken away, of the lower portion of such apparatus.

Similar numerals and letters of reference indicate like parts in both figures.

1 indicates the pan, the bottom 2 of which is slightly dished, as shown in Fig. 1. The pan is supported upon a spider comprising the central hub 3 and radiating arms $a$, and a series of strengthening-bars $b$ are secured to the outer ends of arms $a$ and the wall of the pan. The hub is provided with a series of vertical openings $d$, through which the water and earthy matter are discharged, as will be referred to hereinafter. The lower end $e$ of the hub is ball-shaped and seats in a cup or socket $f$ of a block 4, seated upon a suitable foundation $g$. A conical hood or shield $h$ is secured upon the ball-shaped end of the hub and serves to deflect the water and earthy matter passing through the openings $d$ into a trough $i$ and protects the parts $e$ and $f$.

A shaft 5 is rigidly secured at its lower end to the hub 3 and provided at its upper end with a ball-shaped head 6, which seats in a cup or socket $j$, eccentrically mounted on a disk 7, which receives rotary movement from a shaft 8 through the gearing 9. A series of ropes or rods 10 are secured at their upper ends to a sleeve or collar 11 on the shaft 5, near to its upper end, and at their lower ends to the wall of the pan, holes 12 being provided for the passage of the cords.

A circular track 13 is supported upon blocks or sleepers $c$, below the pan, and the latter is provided with a wear-plate 14, adapted to engage the track.

15 indicates a circular pipe with which a pipe 16 communicates and through which the pulverized ore mixed with water is fed to the circular pipe. The latter is perforated on its lower side and discharges into the pan near its vertical walls. The pipe 15 is suspended by a series of cords 17, secured at their upper ends to a suitable framework.

A telescopic tube 18 is secured at its lower end in the hub 3 above the openings $d$, and the ropes or cords 19 are secured to the inner section and run over pulleys 20, mounted on the shaft 5. By pulling on the ropes 19 the tube can be extended upwardly, as desired. In Fig. 1 it is shown extended to its full length.

The operation is as follows: At the beginning the sections of the telescopic tube will be in their lowest position. The shaft 8 will be started and this will impart a rotary movement to the disk 7, which will result in giving what may be termed a "circular" rocking movement to the pan. The material to be treated being fed into the pan through the pipe 15 will by the movement of the pan be given a whirling movement, always tending from the periphery of the pan toward the center, about in a direction indicated by the arrows. The material will also be constantly agitated, so that only the heaviest particles, the metal, will settle to the bottom of the pan; but even these particles will tend to move toward the center. The water and earthy matter will escape through the tube 18 and holes $d$ into the trough $i$. As soon as the particles of metal have accumulated around the tube 18 to such extent as to be in danger of washing over and out through the tube the latter can be partially extended and the operation continued until the metal particles have accumulated to a height nearly equal to that of the tube when fully extended. The apparatus must then be stopped and the accumulation of metal removed, when it may be again started.

The telescopic tube is an important improvement, as the water and earthy matter may escape from the beginning of the operation, and yet at no time is there danger of the metal washing out.

The track is provided to limit the downward movement of the pan and prevent strains on the shaft and disk.

Having described the invention, I claim—

In an ore-separator, the combination of the pan having a central support upon which it may have a free rocking movement, a shaft connected at its lower end to said support, a rotary disk to which the shaft is eccentrically connected at its upper end by a ball-and-socket joint, ropes connected at their lower ends to the pan and at their upper ends to the shaft, means to supply the material to the pan near its periphery, a telescopic discharge-tube in the center of the pan surrounding said shaft, and operating-ropes connected to the inner section of said tube and running over pulleys on said shaft, substantially as set forth.

In testimony whereof I affix my signature in presence of two witnesses.

JOHN F. MITCHELL.

Witnesses:
R. S. VAN SANT,
E. M. MILLER.